United States Patent [19]

Rabeisen

[11] 4,371,893
[45] Feb. 1, 1983

[54] VIDEO COMMUNICATION SYSTEM ALLOWING GRAPHIC ADDITIONS TO THE IMAGES COMMUNICATED

[76] Inventor: Andre J. Rabeisen, 14 rue Philippe le Hardi, 21000 Dijon, France

[21] Appl. No.: 183,747

[22] Filed: Sep. 3, 1980

[30] Foreign Application Priority Data

Sep. 11, 1979 [FR] France .............................. 79 22653

[51] Int. Cl.³ .......................................... H04N 5/22
[52] U.S. Cl. ....................................... 358/93; 358/183
[58] Field of Search ................... 358/82, 81, 93, 181, 358/183, 226; 340/707, 365 P, 706, 347

[56] References Cited

U.S. PATENT DOCUMENTS

| | | | |
|---|---|---|---|
| 3,104,283 | 9/1963 | Moller | 358/226 |
| 3,617,630 | 11/1971 | Reiffel | 178/18 |
| 3,814,853 | 6/1974 | Lardeau | 358/226 |
| 3,846,826 | 11/1974 | Mueller | 358/81 |
| 3,915,567 | 10/1975 | Altman | 353/66 |
| 3,917,955 | 11/1975 | Inuiya | 340/707 |
| 3,947,103 | 3/1976 | Altman | 353/66 |

Primary Examiner—Howard Britton

Attorney, Agent, or Firm—Young & Thompson

[57] ABSTRACT

A system of video communication which allows the production of a graphic creation which can be transmitted by television receivers at some distance, comprises a projector which projects images on the bottom surface of a screen, through a partly reflective mirror. The image on the screen is fed through this mirror to photographic means which are connected with a storage, recording and/or reproduction system. The screen comprises a semi-transparent sheet which can be provided with a photosensitive coating. The image projected from below onto the screen is visible for an operator who can modify it from above the screen. Another embodiment of screen comprises a transparent lower sheet and a translucent upper sheet of distinctively different colors, with particulate material between them. Pressing with an instrument on the upper sheet displaces the particulate material and temporarily prints on the lower sheet the pressed image of the upper sheet.

This system allows an animation of the projected images by their modification, and can be used for conferences, teaching, tests, etc.

5 Claims, 3 Drawing Figures

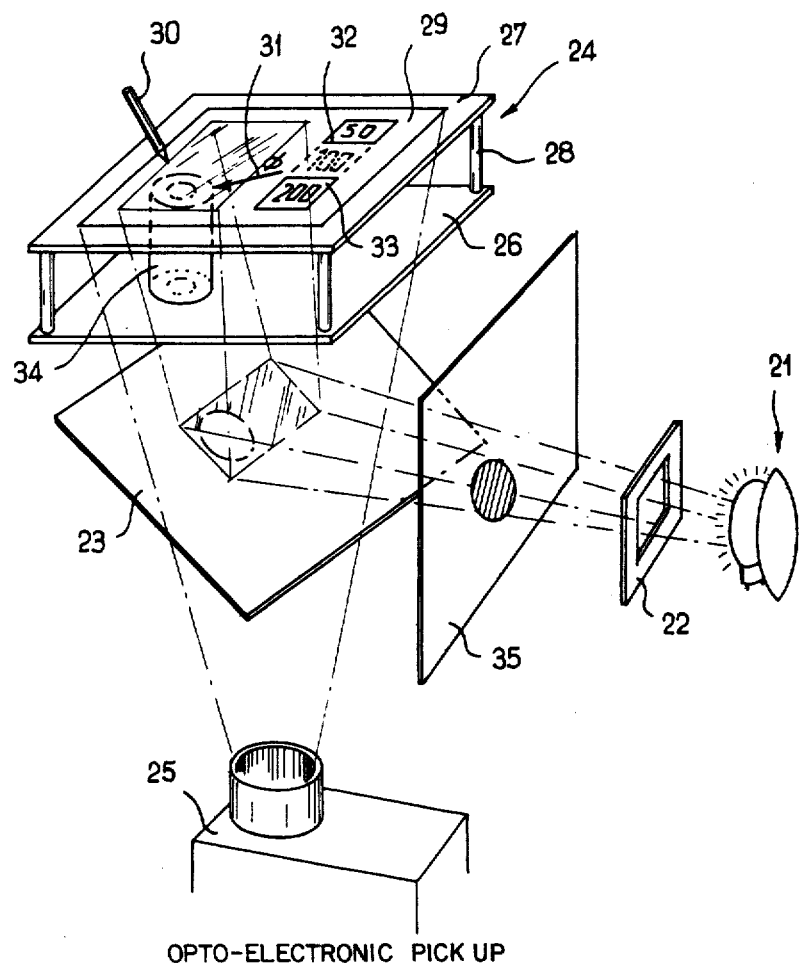
OPTO-ELECTRONIC PICK UP
FIG_3

VIDEO COMMUNICATION SYSTEM ALLOWING GRAPHIC ADDITIONS TO THE IMAGES COMMUNICATED

The present invention concerns systems for video communication.

The use of closed circuit television systems is well known. It is used in various applications, such as for conferences, education, check monitoring in banks, etc. However, all of the existing systems have the same drawback, which is the unalterable nature of what is transmitted by the system. During a televised conference or a course of study, the lecturer or professor places documents before a television camera and the image is transmitted to the receivers. Of course, they can be stationary or animated images, but the images are only of the existing documents as they are.

A system has already been proposed comprising a console formed by a plate of glass or other transparent material, on which can be placed a sheet of paper or the like upon which one can write, and a camera placed under this console picks up the image through the transparent plate. It is possible to write or draw on the sheet of paper, using a pen or a black pencil. If a suitable and relatively thin paper is used, the lines created on it are picked up from below by the camera, and are transmitted by the system to the receivers. In this case, only the lines forming a drawing or a message appear on the screens of the receivers, and the hand of the person which has drawn or written on the sheet of paper does not show. However, although this system permits a certain animation in information or data transmission, it still involves either an original stationary document placed on the console, or an independent animation.

One object of the present invention is to provide a video communication system which permits a direct graphic addition to the existing images.

There also exist systems comprising an image receiving screen which is associated with a computer, so that certain information can be obtained from the computer and presented on the screen, and also so that the information which is presented can be modified or coded. Such modification is subsequently picked up and stored in the computer, but such systems are costly and complex and also require special training of the user.

Therefore, another object of the invention is to provide a system which allows a graphic addition to the image without the necessity of using sophisticated means such as computers of the type required in the aforementioned system.

The invention is embodied in a video communication system, characterized in that it includes image projection means to project images from a support carrying said images, a screen for graphic addition thereto, onto one surface of which these images are projected, this screen embodying an image-receiving surface and a semi-transparent surface on which it is possible to record data or information such that the data or information becomes visible on the image-receiving surface of the screen, opto-electronic means to pick up the images, directed toward this image receiver surface, and known means to assure the transmission and/or the recording and/or the storage of the images which are picked up.

The screen can be formed of one single sheet of semi-transparent, preferably clear plastic, paper or other material, constituting the receiving surface of the screen, a semi-transparent sheet, which can also be plastic, and a particulate material forming a translucent layer, interposed between the aforementioned sheets. The semi-transparent sheet should be black or of an obviously different color from the other sheet. Also, the particulate material can be powdered chalk, talc or analogous material, of which the spheroidal grains, of between 10 and 100 microns, are retained between the two sheets in a plurality of layers, forming a translucent insert.

A pointer can be used to mark a screen of this type, by pressing on the semi-transparent sheet, pushing it into contact with the transparent sheet, pushing aside the particles of the inserted layer, such that a line or a bit of contrasting color appears when this screen is viewed from its transparent surface. This line or bit of contrasting color is of course "viewed" by the opto-electronic image pick-up system. To erase the lines, the screen can be smoothed out on its semi-transparent surface.

The screen for graphic addition to the image could of course also be of another type, and could be formed of a clear surface oriented toward the image projection means and toward the image pick-up system, associated with electronic means for the production of lines of black or dark areas. In this case, an electronic instrument would be used. According to another modification, the screen could also be formed of photocells which can create a color inversion. In each of these cases, the means used are such as to enable returning the screen to its initial color when desired.

According to one modified embodiment, the screen can be formed of a semi-transparent sheet carrying a photosensitive coating on its surface opposite the receiver surface, which allows the preservation of a written line.

According to another modified embodiment, two transparent plates of glass are provided, spaced apart from each other or else displaceable one relative to the other, with a space between them into which one or more three-dimensional objects can be placed. If the plate of glass opposite the direction of image projection constitutes the image receiver surface of the screen, the image of this three-dimensional object will then also be projected on the screen, then picked up by the image pick-up device, such that the object will be integrated into the graphic composition.

If desired, an optical element in the form of a photometric glass wedge can be placed under the screen to eliminate parasitic reflections.

The image projection device can comprise any type of projector, for instance a film projector, a slide projector, a video tape recorder, a video disc apparatus, an epidiascope, etc.

According to one particular feature, a dichroic or semi-reflecting mirror is interposed in an inclined position between the projector and the clear surface of the screen, and the image pick-up system is to the side, directed toward this mirror. Thus, the desired image is projected on the screen through this mirror, and the image, modified if desired by the user, is picked up by being fed through the mirror.

The system to pick up images can be any camera, either optical or electronic. Such devices are known to those skilled in this art. This camera can be connected with an image recording or storage apparatus and/or with a receiver such as a television receiver which reproduces the pick-up images.

The system of the present invention thus allows an operator, such as a lecturer, a professor, etc. to intervene directly on an image projected on the screen to modify it; and the modifications added by the lecturer or professor can be picked up directly on one or more television receivers.

Many applications are possible for such a system, which allows a graphic addition of data into a system, whether for teaching, training, biotechnology, group animation, conferences, transmittal of orders, graphology, behavior studies by tests, etc.

Also, several systems as defined above can work in association, with the image pick-up device of one system then being directly or indirectly connected to the projection means of another system, such that several persons, although separated by some distance, can apply successive modifications to one single image or to a group of images, thus realizing a truly collective creation.

The following description, taken in connection with the attached drawings, gives nonlimiting examples for a better understanding of the invention.

FIG. 3 is a view analogous to FIG. 1 but showing a variation.

Figure 1:
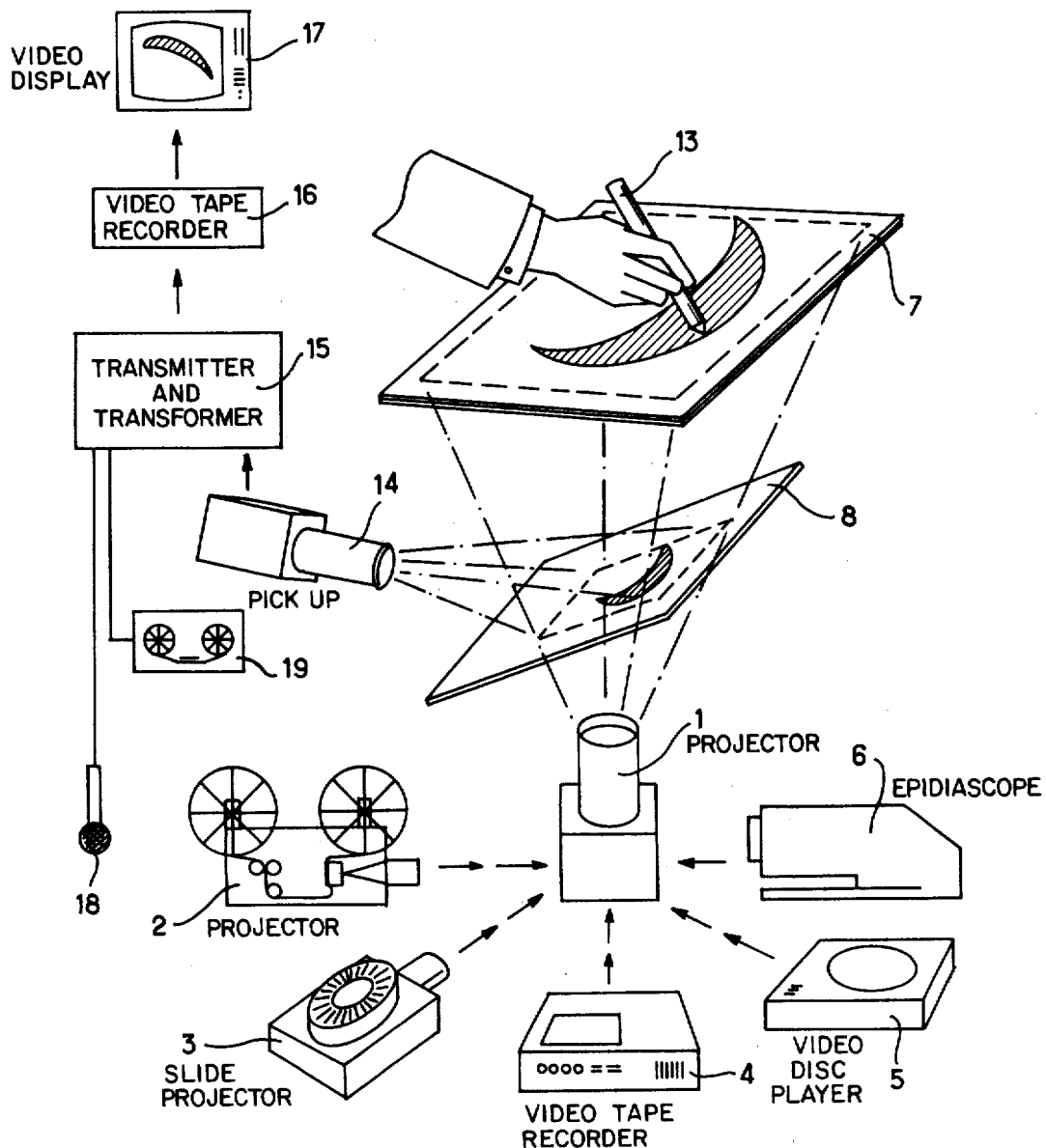
FIG. 1 is a diagrammatic view of the entire system according to the invention.

FIG. 1 is a diagram of an image projector 1. The diagram also shows examples of several types of projectors which can be provided in the system, particularly a film projector 2, a slide projector 3, a video tape recorder 4, a video disc apparatus 5 and an epidiascope 6.

Projector 1 projects through a dichroic or semi-reflecting mirror 8 onto the bottom surface of a screen 7 which will be described hereinafter. In FIG. 1, projector 1 is in vertical position below screen 7, which is horizontal. But of course this screen could be in a more or less inclined position, particularly to facilitate the intervention of the operator. The projector could also occupy other positions.

Figure 2:
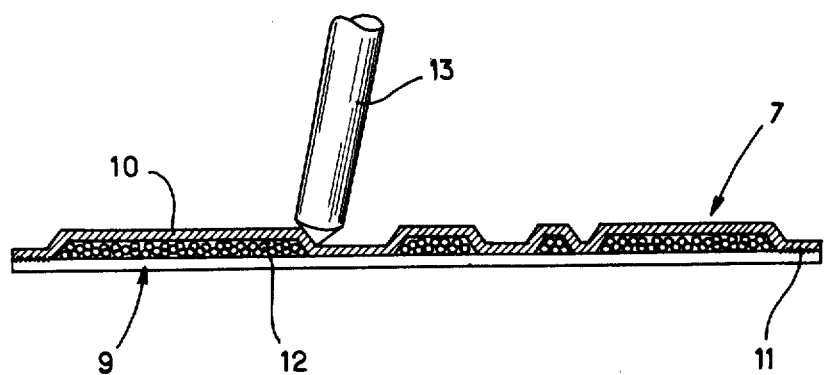
FIG. 2 is a larger scale view of one possible embodiment of the screen for graphic additions which can be used with this system.

For the description of the embodiment of screen 7, refer to FIG. 2.

The screen shown in FIG. 2 comprises a sheet of clear transparent plastic material 9 and a sheet of semi-transparent black material 10, which can have a light transmission coefficient of between 20 and 50%. For practical reasons, a coefficient of 20% constitutes a bottom limit, while that of 50% constitutes the highest necessary for the feedthrough of the image. These two sheets 9, 10 are fused together around the edge of the screen at 11. Several layers of translucent white particulate material 12 are disposed between the two sheets. These particles can for example be particles of chalk, talc or analogous material of a mean grain size between e.g. 10 and 100 microns, and they should have a general spherical shape to facilitate their relative displacement, as will be shown hereinafter.

When screen 7 is not in use, in other words when the two sheets are separated from each other, the image projected on the screen by projector 1 is reflected by a percentage which is a function of the semi-transparent nature of black sheet 10, for example 80%, for a semi-transparent sheet of 20% transparency. The remaining fraction of light forming the image passes through the screen, such that this image is also visible for an operator observing it from above.

If the operator wishes to intervene on the image appearing on the screen in order to modify it, a pointer 13 can be used on the semi-transparent top sheet 10, as shown in FIG. 2, which places sheet 10 in contact with the bottom sheet 9 by pushing aside the particles forming layer 11. Thus, a black area corresponding to the contact zone between the sheets appears on the bottom surface of screen 7. Several such zones have been formed by instrument 13 in FIG. 2. Sheets 9 and 10 remain adhered together under the action of static electricity. If the screen is viewed from below, the image is to be seen projected on the screen, which is 80% reflected, modified by the black areas or lines produced by the operator, such that the original image is modified, allowing a true graphic addition to the image.

The desired correction or modification of the image projected on the screen is simple for the operator, e.g. a lecturer, who sees the image from below the screen by transparency, and the correction or modification which is applied appears on the bottom surface of the screen to be used as shown hereinafter; it too is easily visible to the operator. Nonetheless, neither instrument 13 nor the hand of the operator is visible from below the screen because of the semi-transparent nature of top sheet 10.

In FIG. 1 again, an image pick-up system of optical or electronic type is shown diagrammatically at 14. This system picks up the images appearing on the bottom surface of screen 7, which are fed to its through semi-reflecting mirror 8.

The image pick-up system 14 can be connected with an information transmitter and transformer assembly 15, which converts the images received into information which can be stored on a video tape recorder 16 and transmitted to a television receiver 17 for the reproduction of the images.

Of course these image pick-up means or camera means and the means provided for their use are known and can be of any type.

A microphone and a tape recorder 18 and 19 are connected with system 15 so that commentary on the images can be furnished to television receiver 17.

The system of the present invention is used as follows:

A lecturer is near the system and wishes to make an explanation with projections to the listeners who are at a distance and before television receivers 17.

Projector 1, which can be any of the types indicated, projects one or more images onto the bottom surface of screen 7, which can be commented on by the lecturer. These images are seen both by the lecturer, from above screen 7, and by the opto-electronic system 14, by feed through semi-reflecting mirror 8. They are then transmitted in a traditional manner to receivers 17.

If the lecturer wishes to add something to one or more images, writing instrument 13 can be used on top sheet 10 of screen 7, so as to push aside the particles of translucent material 11 and to place sheet 10 in contact with bottom transparent sheet 9, whereby the two sheets remain adhered together by static electricity. Given that sheet 10 is black, a corresponding black line will appear on the bottom surface of screen 7 and will be visible to system 14, and the modified image will be transmitted to and received by receivers 17 as modified, so that the lecturer can furnish explanations on the subject being discussed, apply changes to a structure, complete graphics or tables, etc. The hand of the lecturer and instrument 13 remain invisible to system 14 from below the screen, as indicated above, and are not visible on the screens of television receivers 17. The result is a true control of the projected images, with any number of possibilities for intervention.

Sheet 9–12 can of course be restored to its original or unmarked condition, simply by shaking it.

In FIG. 3, a light source 21 assures projection of a slide 22, but any aforementioned image projection means could also be used in this case. The image of slide 22 is projected on a semi-reflective mirror 23, which feeds it toward the graphic addition equipment 24. Image pick-up apparatus 25 can be an optical or electronic camera or any other appropriate system.

According to the embodiment considered herein, the graphic addition equipment comprises two transparent non-reflective glass plates 26, 27, which are held apart from each other by posts 28.

Top glass plate 27 serves as support for a semi-transparent sheet of paper 29, such as "onionskin" paper, provided with a traditional photosensitive coating on its top surface, opposite glass plate 27. Because of the semi-transparent nature of this sheet 29, only what appears on its bottom surface in contact with plate 27 is visible to camera 25. Thus, if an operator traces any lines on the top surface of the sheet, for example with the aid of a felt tip pen 30, neither the felt tip nor the hand will be visible to camera 25, such that they will not appear on the transmitted image. On the other hand, a line 31, produced with the aid of such a felt tip pen in a different color from that of paper 29, will appear on the bottom surface of the sheet of semi-transparent paper and will thus be visible to camera 25 on the transmitted image, completing or modifying the originally received image.

This semi-transparent nature of sheet 29, which also has two parallel slots 32 that constitute a slide track, allows the insertion in the slide track of a support 33 carrying inscriptions or the like. One part of this support sliding under sheet 29 is then visible on the image while the other part, hidden by the sheet, does not appear on this image, as a result of the sufficient opacity of the sheet. The inscriptions on the support then also aid in completing the originally received image from the slide.

A three-dimensional object 34 has been placed in the space between the two glass plates 26 and 27. Obviously, then, the image of this object 34 interposed in the path of the light rays will also appear on the image picked up by camera 25 and will thus be integrated into the graphic creation.

The system lends itself to numerous possibilities. A mask 35 can be interposed in the optical path to eliminate a part of the image projected onto equipment 24, for instance in order to aid in showing a three-dimensional object or any other additional projection. The final image can thus be the result of any desired combination of added, subtracted, connected parts, etc. and it can be transmitted for viewing and can be preserved in the form of written lines, as a result of the photosensitive nature of sheet 29.

Modifications can be applied to the embodiments described within the range of technical equivalents, without exceeding the scope of the invention. The screen can be of a different type from that described, and particularly of a type which allows the creation of lines or zones of different color by electronic means or the like.

According to another variation, the television receiver or receivers could also be replaced by a screen or other system analogous to that described. In this case, the operator observing this screen will also be able to intervene on the image, in the same manner as that indicated above, which in fact allows a collective graphic addition, given that this intervention will be accomplished with the knowledge of the first operator.

Finally, according to another variation, drawings or other images can be made to appear in the differentiated zones of the screen by graphic or electronic systems. This then allows substitutions for the original representations in these zones, after their erasure by bringing together the two sheets of the screen.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A system of video communication, comprising a screen, means for projecting images on the screen from beneath the screen, the screen having one transparent lower surface adapted to transmit the images and one semi-transparent upper surface adapted to receive visible markings thereon with the aid of an implement held by a user of the system, opto-electronic means directed toward said lower surface of said screen to pick up from said screen a composite image comprised by the projected image and the added markings, and means for transmitting said composite image.

2. A system as claimed in claim 1, in which said transparent and semi-transparent surfaces are flat and parallel to each other.

3. A system as claimed in claim 2, in which said projector and said opto-electronic means have optical paths intersecting said surfaces at right angles to said surfaces.

4. A system as claimed in claim 3, and a partly reflective mirror disposed in optical paths, one of said optical paths being disposed at equal acute angles to the plane of said mirror, the other of said optical paths passing straight through said mirror.

5. A system as claimed in claim 1, in which said screen is comprised by a first transparent sheet on its lower side, a second semi-transparent sheet on its upper side, and a loose particulate material of a distinctively different color from said second semi-transparent sheet interposed between these two sheets and which can be pushed aside by pressure exerted by an implement held by the user, to permit these sheets to come into contact, thereby creating color-differentiated zones on the side of the transparent sheet which is opposite said particulate material.

* * * * *